US005693746A

United States Patent [19]
Perry

[11] Patent Number: 5,693,746
[45] Date of Patent: Dec. 2, 1997

[54] PREPARATION OF AROMATIC POLYAMIDES FROM CARBON MONOXIDE, A DIAMINE AND AN AROMATIC CHLORIDE

[75] Inventor: Robert James Perry, Pittsford, N.Y.

[73] Assignee: Eastman Chemical Company, Kingsport, Tenn.

[21] Appl. No.: 357,957

[22] Filed: Dec. 16, 1994

[51] Int. Cl.$^6$ ................................................. C08G 73/00
[52] U.S. Cl. ............................................ 528/397; 528/422
[58] Field of Search .................................. 528/397, 422

[56] References Cited

U.S. PATENT DOCUMENTS

| | | | |
|---|---|---|---|
| 4,933,466 | 6/1990 | Perry et al. | 548/476 |
| 4,933,467 | 6/1990 | Perry et al. | 548/476 |
| 4,933,468 | 6/1990 | Perry et al. | 548/476 |
| 5,104,971 | 4/1992 | Perry et al. | 528/397 |
| 5,214,127 | 5/1993 | Perry et al. | 528/422 |
| 5,216,118 | 6/1993 | Perry et al. | 528/336 |
| 5,266,679 | 11/1993 | Perry et al. | 528/322 |

OTHER PUBLICATIONS

Huser, M. et al, "Angewante Chemie, International Edition", (1989) 28, 1386.
Grushin, V. V. et al., "Journal of the Chemical Society, Chemical Communications", (1992), 611.
Ben–David, Y. et al., "Journal of the American Chemical Society", (1989) 111, 8742.
Cassar, L. et al., "Journal of Organometallic Chemistry", (1973) 51, 381.
Brunet, J. J. et al., "Journal of Organic Chemistry", (1983) 48, 1166.
Foa, M. et al., "Journal of Organometallic Chemistry", (1985) 285, 293.
Kudo, K. et al., "Chemistry Letters", (1987), 577.
Scott, W. J., "Journal of the Chemical Society, Chemical Communications", (1987), 1755.
Mutin, R et al., "Journal of the Chemical Society, Chemical Communications", (1988), 896.
Bozell, J. J. et al., "Journal of the American Chemical Society", 110 (1988), 2655.

Primary Examiner—Jeffrey C. Mullis
Attorney, Agent, or Firm—John D. Thallemer; Andrew J. Grifis; Harry J. Gwinnell

[57] ABSTRACT

The present invention is directed to a process for preparing an aromatic polyamide. More specifically, the process involves reacting an aromatic chloride having at least two chlorine atoms covalently bonded to an aromatic ring in non-ortho positions or an aromatic chloroamine having at least one chlorine atom covalently bonded to an aromatic ring and at least one amino group covalently bonded an aromatic ring, carbon monoxide, and a diamine, in the presence of an iodide salt, a catalyst, and a base.

14 Claims, No Drawings

5,693,746

PREPARATION OF AROMATIC POLYAMIDES FROM CARBON MONOXIDE, A DIAMINE AND AN AROMATIC CHLORIDE

FIELD OF THE INVENTION

This invention relates to a process for preparing aromatic polyamides.

BACKGROUND OF THE INVENTION

Aromatic polyamides have been prepared by condensing aromatic diacid chlorides and aromatic diamines in polar aprotic solvents. A disadvantage of such process is that the variety of aromatic polyamides produced is limited by the small number of commercially available diacid chlorides. Another disadvantage is that the diacid chlorides are hydrolytically sensitive. It would therefore be desirable to provide a process capable of producing a wider variety of aromatic polyamides which are not made from hydrolytically sensitive starting materials.

Japanese Kokai 123823 discloses a process for preparing aromatic polyamides by reacting an aromatic diamine, an aromatic dibromide and carbon monoxide in the presence of palladium catalyst in an organic solvent at atmospheric pressure.

U.S. Pat. Nos. 5,104,971, 5,214,127, 5,216,118, 4,933,466, 4,933,467, and 4,933,468, disclose processes for preparing either aromatic polyamides, aromatic polyimides, or aromatic poly(imide-amides) by reacting aromatic amines and aromatic iodides in the presence of a palladium catalyst, a solvent at elevated carbon monoxide pressures.

Both methods for preparing aromatic polyamides utilize bromide and iodide which are expensive halides. It would be desirable to have a process which used a less expensive reagent to prepare aromatic polyamides such as an aromatic chloride.

Huser, M. et al, "Angewante Chemie, International Edition", (Oct. 1989) 28, 1386; Grushin, V. V. et al., "Journal of the Chemical Society, Chemical Communications", (April 15, 1992), 611; and Ben-David, Y. et al., "Journal of the American Chemical Society", (Nov. 22, 1989) 111, 8742, teach that the use of strongly basic and sterically demanding ligands on palladium will induce carbonylation on aryl aromatic chlorides. Cassar, L. et al., "Journal of Organometallic Chemistry", (April 16, 1973) 51, 381, teaches that nickel catalysts will allow carbonylation in some cases and Brunet, J. J. et al., "Journal of Organic Chemistry", (April 22, 1983) 48, 1166; Foa, M. et al., "Journal of Organometallic Chemistry", (April 16, 1985) 285, 293; and Kudo, K. et al., "Chemistry Letters", (April 1987), 577, teach that cobalt complexes sometimes work.

Scott, W. J., "Journal of the Chemical Society, Chemical Communications", (Dec. 1, 1987), 1755 and Mutin, R. et al., "Journal of the Chemical Society, Chemical Communications", (July 1, 1988), 896, teach palladium catalyzed carbonylation reactions of chloroarenes using $Cr(CO)_3$. Bozell, J. J. et al., "Journal of the American Chemical Society" 110 (April 13, 1988), 2655, teaches a palladium catalyzed carbonylation reaction of chloroarenes which requires both Ni and Pd catalysts and the presence of NaI.

Accordingly, what is needed is a process for preparing a wide variety of aromatic polyamides which utilizes a carbonylation and coupling reaction rather than the conventional condensation reaction between diacid chloride and diamines. Moreover, the process should allow the use of inexpensive aromatic chlorides instead of hydrolytically unstable acid chlorides.

SUMMARY OF THE INVENTION

The present invention is directed to a process for preparing an aromatic polyamide, said process comprising reacting carbon monoxide, a diamine and an aromatic chloride having at least two chlorine atoms covalently bonded to an aromatic ring in non-ortho positions, wherein said process is conducted in the presence of an iodide salt, a catalyst, and a base.

The present invention is also directed to a process for preparing an aromatic polyamide, said process comprising reacting carbon monoxide with an aromatic chloroamine having at least one chlorine atom covalently bonded to an aromatic ring and at least one amino group covalently bonded an aromatic ring, wherein said process is conducted in the presence of an iodide salt, a transition metal catalyst, and a base.

DESCRIPTION OF THE INVENTION

The process of the present invention for preparing aromatic polyamides involves reacting carbon monoxide (CO), a diamine and an aromatic di- or tri-chloride. It is convenient to add an excess of carbon monoxide to the reaction. Carbon monoxide can be at or below atmospheric pressure or at a higher pressure. One can readily adjust the carbon monoxide pressure by pressurizing the reaction vessel with carbon monoxide to the desired reaction pressure. The carbon monoxide can be diluted with inert gases such as nitrogen or Argon.

The diamines have two or more primary amino groups within the molecule and are liquids or solids that are soluble or dispersible in the reaction mixture. Useful diamines include aliphatic diamines having 2 to 23 carbon atoms which are saturated. The aliphatic diamines may contain one or more non-aryl rings or be acyclic. Preferably, the aliphatic diamines are primary alkyl diamines wherein the alkyl group has 5 to 10 carbon atoms. The alkyl groups can be branched or unbranched. Useful diamines also include aromatic diamines having 6 to 14 carbon atoms, preferably 6 to 8 carbon atoms, and heteroaromatic diamines having 5 to 14 carbon atoms, preferably 6 to 8 carbon atoms. A combination of diamines may also be used.

The diamine may contain primary and/or secondary amine derivatives of a fused or bridged ring system. There may be two or more primary amino groups substituted on a benzenoid nucleus or a bridged ring system. Specific diamines include:

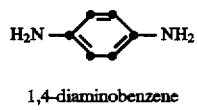

1,4-diaminobenzene

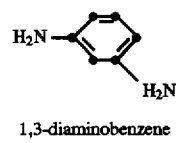

1,3-diaminobenzene

-continued

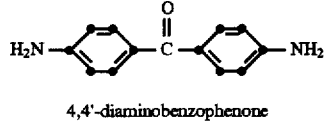
4,4'-diaminobenzophenone

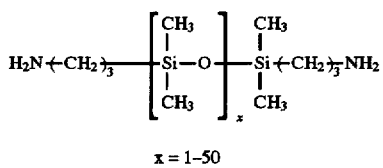
x = 1–50
bis(3-aminopropyl)tetramethyldisiloxane for x = 1

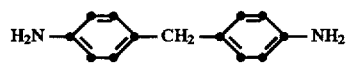
4,4'-diaminodiphenylmethane

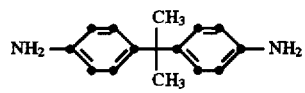
2,2-bis(4-aminophenyl)propane

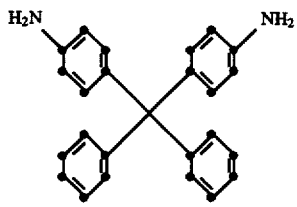
4,4'-diaminotetraphenylmethane

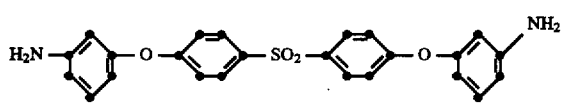
4,4'-bis(3-aminophenoxy)diphenylsulfone

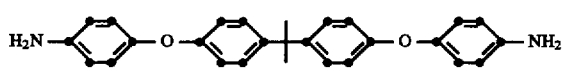
2,2-bis[4-(4-aminophenoxy)phenyl]propane

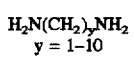
$H_2N(CH_2)_yNH_2$
y = 1–10 terminal diaminoalkane

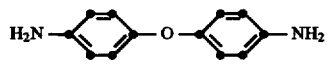
4,4'-diaminodiphenylether

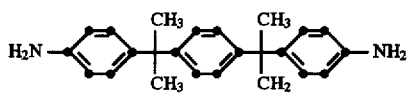
1,4-bis[2-(4-aminophenyl)propyl]benzene

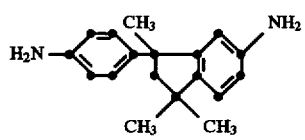
5-amino-3-(4-aminophenyl)-1,1,3-trimethylindane

-continued

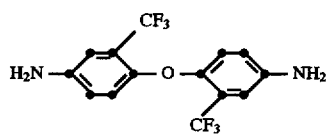
2,2'-bis(trifluoromethyl)-4,4'-diaminodiphenylether

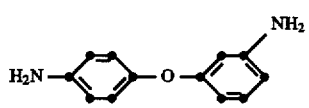
3,4'-diaminodiphenylether

The aromatic chloride has at least two chloro radicals bonded to an aromatic nucleus in non-ortho positions. Compounds having two chlorine atoms are preferred, but aromatic compounds having three or more chloride atoms are also useful. For example, chloroaromatics can be used. It is preferred that the polychloroaromatics be free of Groups which unduly retard reaction by stearic hindrance or by lowering the activity of the catalyst.

Suitable aromatic chlorides are hydrocarbon aromatics activated by an electron withdrawing group. The electron withdrawing group cannot be a halogen and must have a Hammett sigma constant with a value greater than 0.10, preferably greater than 0.25. Preferred electron withdrawing groups are sulfone, ketone, ester, phthalimido, and nitrile. Preferred aromatic chlorides are: 4,4'-dichlorodiphenylsulfone, 4,4'-dichlorobenzophenone, 4,4'-dichloro-9,10-anthraquinone, 2,6-dichloro-9,10-anthraquinone, and 2,7-dichloro-9,10-anthraquinone. Most preferrably, the aromatic chloride is selected from 4,4'-dichlorobenzophenone and 4,4'-dichlorodiphenylsulfone.

Alternatively, rather than reacting the carbon monoxide with a diamine and an aromatic chloride as described above, the carbon monoxide can be reacted with an aromatic chloroamine. Aromatic chloroamines useful herein are characterized by having at least one chlorine atom covalently bonded to an aromatic ring and contain at least one amino group covalently bonded to the same molecule. Preferred aromatic chloroamines include:

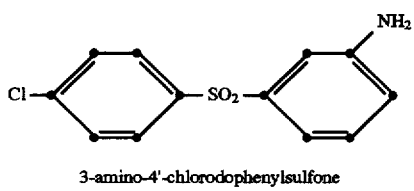
3-amino-4'-chlorodophenylsulfone

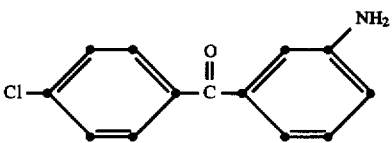
3-amino-4'-chlorodiphenylbenzophenone

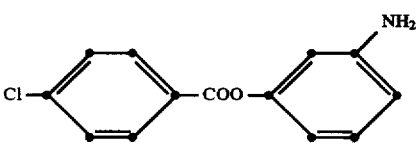

-continued
4-chloro-(3-aminophenyl)benzoate

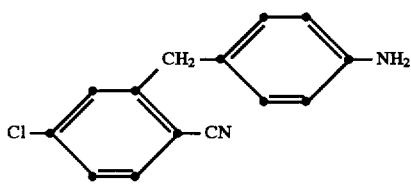

4-amino-2'-cyano-5'-chlorodiphenylmethane

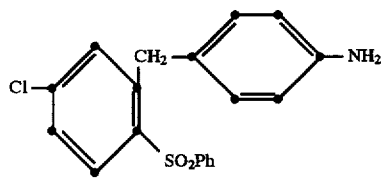

4-amino-2'-(phenylsulfonyl)-5'-chlorodiphenylmethane

The process proceeds well when the diamine compounds are contacted in approximately stoichiometric amounts. However, it is not necessary to use stoichiometric quantities. An excess of a reactant can be used to drive the reaction toward completion. A convenient amount of excess preferably is used. In other words, one employs an amount of excess which provides the desired result, but which does not unduly hinder the process by adding unacceptable cost, or by complicating the process by making it unduly difficult to separate product from unreacted materials. When one of the organic reactants is used in excess, it is preferably used in an amount of from 1.001 to about 5 times the molar amount dictated by stoichiometry.

Although reactants are discussed herein as individual compounds, the process of the present invention is not limited to using individual compounds as reactants, but also includes using mixtures of compounds as reactants. It is desirable that the reactants not be subject to an unacceptable amount of undesirable side reactions to prevent the formation of an unacceptable amount of by-product. It is also desirable that the reactants be free of groups which unduly retard the reaction by, for example, stearic hindrance or lowering the activity of the catalyst.

In addition to carbon monoxide, a diamine and an aromatic chloride, the process of the present invention is conducted in the presence of an iodide salt, a catalyst, and a base. The iodide salt is added in an amount of 0.01 to 5 equivalents based on the equivalents of aromatic chloride or aromatic chloroamine, more preferably in an amount of 0.25 to 2.5 equivalents based on the equivalents of aromatic chloride or aromatic chloroamine. While not wishing to be bound to any particular theory, the inventor believes that the iodide reacts with a neutral Pd(O) complex to form a more reactive anionic Pd(O) catalyst which more readily reacts with chloraromatic compounds. The iodide salt may be added as an inorganic salt such as NaI, KI or other dissociative iodide salt, or as an organic salt such as $R_3NH^{\oplus}I^{\ominus}$, $R_4N^{\oplus}I^{\ominus}$, $R_3P^{\oplus}I^{\ominus}$ and the like, wherein R is an aliphatic, aryl, or alkaryl group.

The catalyst for use in the present invention is a transition metal catalyst containing palladium, platinum and nickel compounds. The preferred catalyst is a palladium complex in the zero valent or divalent state. The palladium catalyst generally has one or more ligands bonded to one or more palladium atoms by ionic or covalent bonds. Simple palladium salts such as $PdX_2$, in which X is Cl, Br or I, can be used as the catalyst. Specific examples of other palladium catalysts are listed in Table I.

TABLE 1

| Palladium Catalysts Palladium complexes in the divalent oxidation state: | |
|---|---|
| $PdX_2L_2$ | X = Cl, Br, or I<br>L = $R^1{}_3P$, $R^1$ = alkyl or aryl groups |
| $Pd(OAc)_2$ | OAc = acetate |
| $Pd(OAc)_2L_2$ | OAc = acetate |
| $PdCl_2(R^2CN)_2$ | $R^2$ = methyl, phenyl |
| $PhPdXL_2$ | X = Br, I |
| $PdCl_2(COD)_2$ | COD = cis, cis-1,5-cyclooctadiene |
| $Pd(acac)_2$ | acac = 2,4-pentanedionate |
| $PdCl_2DPPF$ | DPPF = 1,1'-bis(diphenylphosphino)-ferrocene |
| $PdCl_2DPPE$ | DPPE = 1,2-bis(diphenylphosphino)ethane |
| $PdCl_2DPPP$ | DPPP = 1,3-bis(diphenylphosphino)propane |
| $PdCl_2DPPB$ | DPPB = 1,4-bis(diphenylphosphino)butane |
| Palladium complexes in the zero valent oxidation state: | |
| $PdL_4$ | L = $R^1{}_3P$, $R^1$ = alkyl or aryl groups |
| 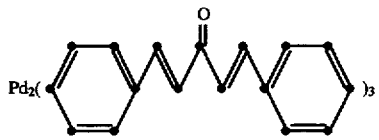 | |
| $Pd(DPPE)_2$ | DPPE = 1,2-bis(diphenylphosphino)ethane |
| $Pd(DPPP)_2$ | DPPP = 1,3-bis(diphenylphosphino)propane |
| $Pd(DPPB)_2$ | DPPB = 1,4-bis(diphenylphosphino)butane |

A catalytic amount of the, catalyst is employed. The term "catalytic amount" refers to an amount of catalyst which catalyzes the reaction to the desired extent. Generally, the amount of catalyst is at least 0.005 equivalents based on the equivalents of aromatic chloride or aromatic chloroamine. Preferrably, the catalyst is present in an amount of 0.005 to 0.20, more preferrably 0.01 to 0.1 equivalents based on the equivalents of aromatic chloride or aromatic chloroamine. There is no upper or lower limit on the amount of catalyst other than cost and ease of separation of the catalyst from products and unreacted reactants. The catalyst can be bound to a support or unsupported.

Optionally, a ligand such as phosphine or arsine can be included in the process. Such ligands along with the transition metal catalyst increase the rate of the catalyzed reaction. The amount of ligand used is preferably 0.01 to 5.0 equivalents per equivalent of catalyst. More preferably, the amount of ligand used is about 2.0 equivalents per equivalent of catalyst. While not wishing to be bound by any theory, the present inventors believe that the ligand speeds up the oxidative addition of the catalyst by making the catalyst more nucleophilic.

A base is used in the process of the present invention to neutralize by-product hydrogen halide. Useful organic bases include tertiary amines having the formula $NR'_3$ wherein each R' is independently selected from lower alkyl groups having from 2 to 6 carbon atoms. Specific tertiary amines are tributylamine, 1,3-diazobicyclo(5,4,0)-7-undecene (DBU), and 1,5-diazobicyclo(4,3,0)non-5-ene (DBN). The base can be immobilized on a cross-linked polymer such as cross-linked poly(vinylpyridine) beads. Generally, one employs at least enough base to react with the by-product hydrogen halide produced. Excess base can be used, however, excess base may slow the rate of reaction. The base is present in an amount of 0.1 to 100 equivalents based on the equivalents of aromatic chloride or aromatic chloroamine. Preferably, the base is present in an amount of 0.5 to 10 equivalents, most preferably 1 to 5 equivalents, based on the equivalents of aromatic chloride or aromatic chloroamine.

The process of the present invention is optionally conducted in the presence of an organic solvent which appreciably dissolves both reactants to provide a liquid reaction medium and facilitates the contacting of the reactants and the catalyst. It is desirable that the organic solvent be "inert" to the reaction, i.e., that the solvent not enter into the reaction in an undesired way. Preferred organic solvents include hydrocarbon solvents having $C_5$–$C_{20}$, such as toluene and xylene; ether solvents characterized by $R^3OR^3$ wherein $R^3$ is an aliphatic or aromatic hydrocarbon having $C_4$–$C_{10}$, such as tetrahydrofuran, diglyme (2-methoxyethyl ether), and glyme (1,2-dimethoxyethane); dipolar aprotic solvents having wherein a highly polar molecule with hydrogens that are not easily abstractable. Preferred dipolar aprotic solvents include: N,N-dimethylformamide, N,N-dimethylacetamide, dimethyl-sulfoxide, 1,3-dimethyl-2-imidazolidinone, hexamethylphosphoramide, N-methylpyrrolidinone, N-cyclohexylpyrrolidinone, dimethylimidazolidinone, and the like.

The amount of solvent present is not critical to the reaction, however, it is desirable to use enough solvent to facilitate the reaction. Specific polymers can have optimum concentrations in various solvents. There is no theoretical upper limit on the amount of solvent employed, however, practical limits are imposed by the size of the reaction vessel, the ease of separation of product from the reaction medium, cost and other factors. Preferably, the amount of solvent used is 0.1 to 10,000 weight percent based on the weight of aromatic chloride or aromatic chloroamine. More preferably, the solvent is used in an amount of 0.5 to 5000 weight percent, most preferably 1000 to 5000 weight percent based on the weight of aromatic chloride or aromatic chloroamine.

The process of this invention is preferably conducted at a temperature within the range of 20° C. to 250° C. with agitation to facilitate the dissolution of carbon monoxide and reactants. More preferably, the temperature range is 70° C. to 200° C., and most preferably 90° C. to 125° C. Generally, temperatures above 250° C. should be avoided since decomposition of products or reactants may occur. At temperatures below 20° C., the rate of reaction is generally too slow.

The reaction time is from 0.1 to 100 hours, preferably 0.5 to 50 hours. The reaction time is dependent on such reaction parameters as the reactivity of the reactants, activity and amount of catalyst, reaction temperature, pressure and so forth.

The process of the present invention is used to prepare aromatic polyamides which are useful as homopolymers, block copolymers or random copolymers or in blends with other materials or polymers. It is within the scope of the methods of the invention to produce aromatic polyamides having number average molecular weights between about 1,000 and about 150,000. The aromatic polyamides can be used for engineering plastics or fibers or other high performance applications.

The materials and testing procedures used for the results shown herein are as follows:

The following monomers were used in the Examples: bis(4-chlorophenyl)sulfone (1a) which has the following structure:

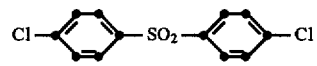

4,4'-dichlorobenzophenone (1b) which has the following structure:

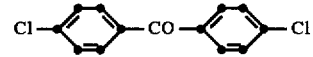

4,4'-diaminodiphenylether (2a) which has the following structure:

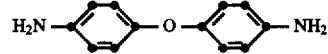

2,2-bis[4-(4-aminophenoxy)phenyl]propane (2b) which has the following structure:

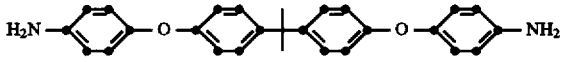

4,4'-bis(3-aminophenoxy)diphenylsulfone (2c) which has the following structure:

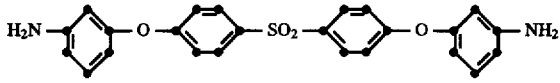

Size exclusion chromatography (SEC) data was obtained from a Waters HPLC using two Jordi's DVB columns and calibrated with PMMA standards between 2,000 and 1,600,000 daltons. Samples were dissolved in DMF containing 0.0M LiNO$_3$. All samples were filtered prior to injection and results are reported as poly(methylmethacrylate) (PMMA) equivalent molecular weights.

FTIR spectra were recorded on a Nicolet 60SX spectrometer as KBr pellets. Carbonyl stretches at 1640–1680 cm$^{-1}$ were indicative of amide C=O bonds.

The process of the present invention will be further illustrated by a consideration of the following examples, which are intended to be exemplary of the invention.

EXAMPLE I

A 120 mL pressure reaction vessel containing a stirring bar, a pressure gauge, a pressure release valve, a gas inlet and a straight ball valve for degassing and sample withdrawal, was charged with 862 mg (3.00 mmol) of aromatic dichloride 1a, 601 mg (3.00 mmol) of diamine 2a, 63 mg (0.09 mmol) of bis(triphenylphosphine)palladium(II) chloride), 72 mg (0.18 mmol) of 1,2-bis(diphenylphosphino) ethane, 1.08 mL (7.2 mmol) of 1,8-diazabicyclo[5.4.0] undec-7-ene, 899 mg (6.00 mmol) of NaI, and 18 mL of DMAc. The reaction mixture was degassed, placed under 1 atmosphere of carbon monoxide and heated to 115° C. for 24 hours. The reaction mixture was filtered through filter aid, concentrated, precipitated twice into MeOH, washed extensively with MeOH and dried in vacuo for 24 hours at 90° C./1 torr to yield 1.41 grams of an aromatic polyamide. The aromatic polyamide had the following properties: $M_w$=17,400; $M_n$=12,200; $\nu_{CO}$=1654 cm$^{-1}$. The test results are summarized in Table I.

EXAMPLE II

A pressure reaction vessel as described in Example I was charged with 862 mg (3.00 mmol) of aromatic dichloride 1a, 1232 mg (3.00 mmol) of diamine 2b, 63 mg (0.09 mmol) of bis(triphenylphosphine)palladium(II)chloride, 72 mg (0.18 mmol) of 1,2-bis(diphenylphosphino)ethane, 1.08 mL (7.2 mmol) of 1,8-diazabicyclo[5.4.0]undec-7-ene, 899 mg (6.00 mmol) of NaI, and 18 mL of DMAc. The same reaction times and procedure as set forth in Example I were used. The aromatic polyamide which was recovered, 2.2 grams, had the following properties: $M_w$=19,500; $M_n$=11,700; $\nu_{CO}$= 1654 cm$^{-1}$. The test results are summarized in Table I.

EXAMPLE III

A pressure reaction vessel as described in Example I was charged with 862 mg (3.00 mmol) of aromatic dichloride 1a, 1298 mg (3.00 mmol) of diamine 2c, 63 mg (0.09 mmol) of bis(triphenylphosphine)palladium(II)chloride, 72 mg (0.18 mmol) of 1,2-bis(diphenylphosphino)ethane, 1.08 mL (7.2 mmol) of 1,8-diazabicyclo[5.4.0]undec-7-ene, 899 mg (6.00 mmol) of NaI, and 18 mL of DMAc. The same reaction times and procedure as set forth in Example I were used. The aromatic polyamide which was recovered, 2.2 grams, had the following properties: $M_w$=30,400; $M_n$=17,400; $\nu_{CO}$= 1661 cm$^{-1}$. The test results are summarized in Table I.

EXAMPLE IV

A pressure reaction vessel as described in Example I was charged with 753 mg (3.00 mmol) of aromatic dichloride 1b, 601 mg (3.00 mmol) of diamine 2a, 63 mg (0.09 mmol) of bis(triphenylphosphine)palladium(II)chloride, 72 mg (0.18 mmol) of 1,2-bis(diphenylphosphino)ethane, 1.08 mL (7.2 mmol) of 1,8-diazabicyclo[5.4.0]undec-7-ene, 899 mg (6.00 mmol) of NaI, and 18 mL of DMAc. The same reaction times and procedure as set forth in Example I were used. The aromatic polyamide which was recovered, 1.29 grams, had the following properties: $M_w$=17,600; $M_n$=11,500; $\nu_{CO}$= 1707 cm$^{-1}$, and 1652 cm$^{-1}$. The test results are summarized in Table I.

EXAMPLE V

A pressure reaction vessel as described in Example I was charged with 753 mg (3.00 mmol) of aromatic dichloride 1b, 1232 mg (3.00 mmol) of diamine 2b, 63 mg (0.09 mmol) of bis(triphenylphosphine)palladium(II)chloride, 72 mg (0.18 mmol) of 1,2-bis(diphenylphosphino)ethane, 1.08 mL (7.2 mmol) of 1,8-diazabicyclo[5.4.0]undec-7-ene, 899 mg (6.00 mmol) of NaI, and 18 mL of DMAc. The same reaction times and procedure as set forth in Example I were used. The aromatic polyamide which was recovered, 2.4 grams, had the following properties: $M_w$=37,200; $M_n$=19,900; $\nu_{CO}$= 1710 cm$^{-1}$ and 1646 cm$^{-1}$. The test results are summarized in Table I.

EXAMPLE VI

A pressure reaction vessel as described in Example I was charged with 753 mg (3.00 mmol) of aromatic dichloride 1b, 1298 mg (3.00 mmol) of diamine 2c, 63 mg (0.09 mmol) of bis(triphenylphosphine)palladium(II)chloride, 72 mg (0.18 mmol) of 1,2-bis(diphenylphosphino)ethane, 1.08 mL (7.2 mmol) of 1,8-diazabicyclo[5.4.0]undec-7-ene, 899 mg (6.00 mmol) of NaI, and 18 mL of DMAc. The same reaction times and procedure as set forth in Example I were used. The aromatic polyamide which was recovered, 1.60 grams, had the following properties: $M_w$=6,700; $M_n$=5,500; $\nu_{CO}$=1708 cm$^{-1}$ and 1677 cm$^{-1}$. The test results are summarized in Table I.

TABLE I

Aramid Formation

| Ex. | Dichloro | Diamine | PMMA Equiv. Molecular wts. Mw | Mn | Carbonyl Stretches cm$^{-1}$ |
|---|---|---|---|---|---|
| I | 1a | 2a | 17,400 | 12,200 | 1654 |
| II | 1a | 2b | 19,500 | 11,700 | 1654 |
| III | 1a | 2c | 30,400 | 17,400 | 1661 |
| IV | 1b | 2a | 17,600 | 11,500 | 1707, 1652 |
| V | 1b | 2b | 37,206 | 19,900 | 1710, 1646 |
| VI | 1b | 2c | 6,700 | 5,500 | 1708, 1677 |

The results in Table I clearly indicate that the process of the present invention can be used to prepare aromatic polyamides as seen by the molecular weights and the amide C=O stretches in the infra-red-spectra.

The process of the present invention allows for the preparation of a variety of aromatic polyamides using inexpensive aromatic chlorides reacted with diamines in the presence of carbon monoxide and iodide to result in unexpectedly faster aromatic polyamide formation rates than without added iodide.

Many variations will suggest themselves to those skilled in this art in light of the above detailed description. All such obvious modifications are within the full intended scope of the appended claims.

What is claimed is:

1. A process for preparing an aromatic polyamide comprising reacting carbon monoxide, a diamine, and a compound selected from the group consisting of 2,6-dichloro-9,10-anthraquinone, and 2,7-dichloro-9,10-anthraquinone, wherein said process is conducted at less than 30 psig carbon monoxide pressure in the presence of an iodide salt, a transition metal catalyst, a based and an organic solvent.

2. The process of claim 1 wherein the diamine is selected from the group consisting of aliphatic diamines having 2 to 23 carbon atoms, aromatic diamines having 6 to 14 carbon atoms, heteroaromatic diamines having 5 to 14 carbon atoms, and combinations thereof.

3. The process of claim 2 wherein the diamine is selected from the group consisting of

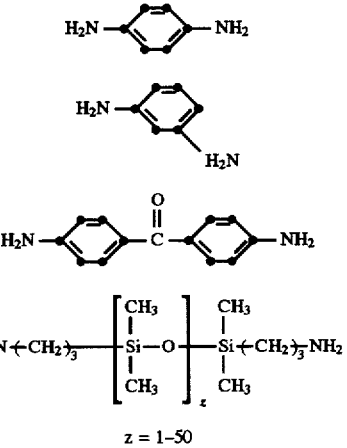

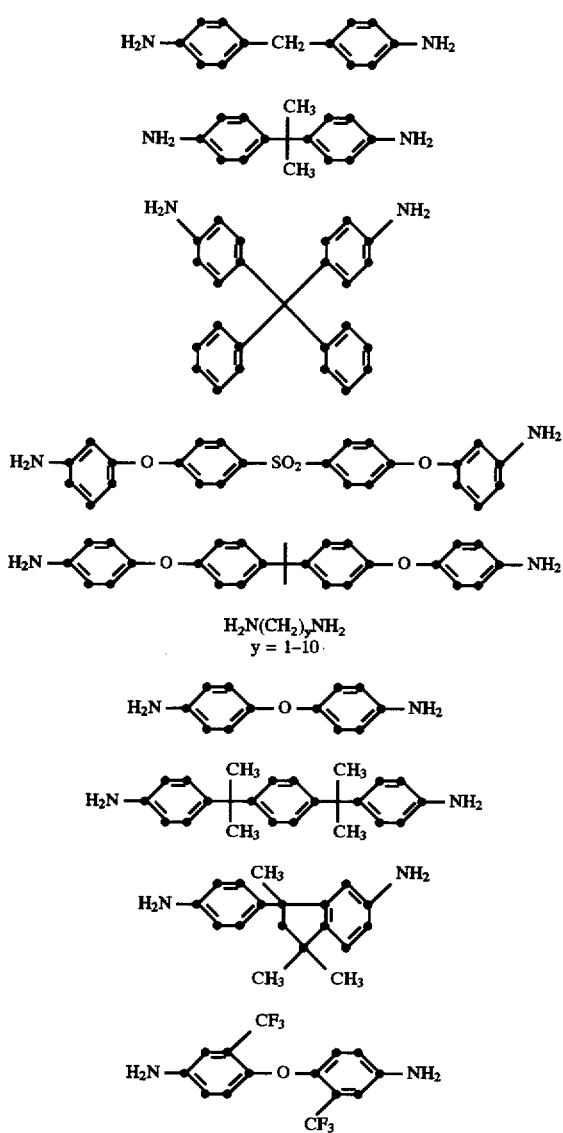

and combinations thereof.

4. The process of claim 1 wherein the iodide salt is selected from the group consisting of an inorganic iodide salt, an organic iodide salt, and combinations thereof.

5. The process of claim 4 wherein the inorganic iodide salt is selected from the group consisting of sodium iodide, lithium iodide, potassium iodide magnesium iodide, and calcium iodide.

6. The process of claim 4 wherein said organic iodide salt is selected from the group consisting of quaternary ammonium iodides, and quaternary phosphonium iodides.

7. The process of claim 1 wherein the catalyst is selected from the group consisting of platinum, nickel, and palladium complexes.

8. The process of claim 7 wherein the palladium complex is a palladium salt having the formula $PdX_2$ wherein X is Cl, Br or I.

9. The process of claim 8 wherein the palladium complex is bis(triphenylphosphine)palladium(II)chloride.

10. The process of claim 1 which additionally contains a ligand in an amount of 0.01 moles to 5 moles per mole of transition metal catalyst.

11. The process of claim 1 wherein the base is selected from the group consisting of tertiary amines, $NR'_3$ wherein R' is independently selected from lower alkyl groups having 2 to 6 carbon atoms, and combinations thereof.

12. The process of claim 11 wherein the base is a tertiary amine selected from the group consisting of tributylamine, 1,3-diazobicyclo(5,4,0)-7-undecene, 1,5-diazobicyclo(4,3,0)non-5-ene, and combinations thereof.

13. The process of claim 1 wherein the organic solvent is a dipolar aprotic solvent.

14. The process of claim 13 wherein the dipolar aprotic solvent is selected from the group consisting of dimethylformamide, dimethylacetamide, dimethylsulfoxide, 1,3-dimethyl-2-imidazolidinone, hexamethylphosphoramide, N-methylpyrrolidinone, N-cyclohexylpyrrolidinone, dimethylimidazolidinone, and mixtures thereof.

* * * * *